United States Patent
Daly et al.

(10) Patent No.: US 9,311,228 B2
(45) Date of Patent: Apr. 12, 2016

(54) POWER REDUCTION IN SERVER MEMORY SYSTEM

(75) Inventors: David M. Daly, Yorktown Heights, NY (US); Tejas Karkhanis, White Plains, NY (US); Valentina Salapura, Chappaqua, NY (US)

(73) Assignee: International Business Machines Corporation, Armonk, NY (US)

( * ) Notice: Subject to any disclaimer, the term of this patent is extended or adjusted under 35 U.S.C. 154(b) by 688 days.

(21) Appl. No.: 13/439,457

(22) Filed: Apr. 4, 2012

(65) Prior Publication Data
US 2013/0268741 A1    Oct. 10, 2013

(51) Int. Cl.
| | |
|---|---|
| *G06F 12/00* | (2006.01) |
| *G06F 12/02* | (2006.01) |
| *G06F 11/34* | (2006.01) |
| *G06F 12/06* | (2006.01) |

(52) U.S. Cl.
CPC .......... *G06F 12/023* (2013.01); *G06F 11/3409* (2013.01); *G06F 11/3471* (2013.01); *G06F 12/06* (2013.01); *G06F 2201/81* (2013.01); *G06F 2201/88* (2013.01); *G06F 2212/1028* (2013.01); *G06F 2212/2532* (2013.01); *G06F 2212/502* (2013.01); *Y02B 60/1225* (2013.01); *Y02B 60/165* (2013.01)

(58) Field of Classification Search
CPC .... G06F 1/3203; G06F 3/0647; G06F 12/023
USPC ............... 711/165, E12.002, 170; 713/320
See application file for complete search history.

(56) References Cited

U.S. PATENT DOCUMENTS

| | | | |
|---|---|---|---|
| 5,365,487 A | | 11/1994 | Patel et al. |
| 5,696,989 A | * | 12/1997 | Miura et al. .................... 710/24 |
| 6,938,119 B2 | | 8/2005 | Kohn et al. |
| 6,938,146 B2 | | 8/2005 | Shafi et al. |
| 6,954,837 B2 | | 10/2005 | Woo et al. |
| 7,010,656 B2 | | 3/2006 | Gupta |

(Continued)

OTHER PUBLICATIONS

Kougia et al., "Power Reduction for Multimedia Applications Through Data-Reuse Memory Exploration", supported by the ED 501 PENED'99 project funded by G.S.R.T. of the Greek Ministry of Development and European Union, 0-7803-7057-0/01, 2001 IEEE, pp. 1065-1068.

(Continued)

*Primary Examiner* — Reginald Bragdon
*Assistant Examiner* — Mehdi Namazi
(74) *Attorney, Agent, or Firm* — Scully, Scott, Murphy & Presser, P.C.; Daniel P. Morris, Esq.

(57) ABSTRACT

A system and method for reducing power consumption of memory chips outside of a host processor device inoperative communication with the memory chips via a memory controller. The memory can operate in modes, such that via the memory controller, the stored data can be localized and moved at various granularities, among ranks established in the chips, to result in fewer operating ranks. Memory chips may then be turned on and off based on host memory access usage levels at each rank in the chip. Host memory access usage levels at each rank in the chip is tracked by performance counters established for association with each rank of a memory chip. Turning on and off of the memory chips is based on a mapping maintained between ranks and address locations corresponding to sub-sections within each rank receiving the host processor access requests.

16 Claims, 7 Drawing Sheets

(56) References Cited

U.S. PATENT DOCUMENTS

| | | |
|---|---|---|
| 7,028,200 B2 | 4/2006 | Ma |
| 7,081,897 B2 | 7/2006 | Garg |
| 7,100,013 B1 * | 8/2006 | de Waal ............... 711/170 |
| 7,315,484 B2 | 1/2008 | Yang et al. |
| 7,339,840 B2 | 3/2008 | Wallner et al. |
| 7,549,034 B2 | 6/2009 | Foster, Sr. et al. |
| 7,587,559 B2 | 9/2009 | Brittain et al. |
| 7,707,366 B2 | 4/2010 | Tagawa |
| 7,962,715 B2 | 6/2011 | Ware |
| 2003/0093614 A1 | 5/2003 | Kohn et al. |
| 2003/0120855 A1 * | 6/2003 | Hatakeyama et al. ............ 711/5 |
| 2003/0151967 A1 | 8/2003 | Nagai et al. |
| 2004/0193829 A1 * | 9/2004 | Woo et al. ............... 711/170 |
| 2005/0160151 A1 | 7/2005 | Rawson, III |
| 2006/0136767 A1 | 6/2006 | Ma |
| 2007/0016807 A1 | 1/2007 | Lim |
| 2007/0283178 A1 | 12/2007 | Dodeja et al. |
| 2008/0005516 A1 | 1/2008 | Meinschein et al. |
| 2008/0065914 A1 | 3/2008 | Kark et al. |
| 2008/0072116 A1 | 3/2008 | Brittain et al. |
| 2008/0098243 A1 | 4/2008 | Saewong et al. |
| 2008/0225614 A1 | 9/2008 | Brown |
| 2008/0313482 A1 | 12/2008 | Karlapalem et al. |
| 2010/0220536 A1 | 9/2010 | Coteus et al. |
| 2010/0262751 A1 | 10/2010 | Avudaiyappan |
| 2010/0332775 A1 | 12/2010 | Kapil et al. |

OTHER PUBLICATIONS

Lee et al., "Entry Control in Network-on-Chip for Memory Power Reduction", ISLPED'08, Aug. 11-13, 2008, Bangalore, India, 2008 ACM 978-1-60558-109-5/08/08, pp. 171-176.

"Configurable Rank Translation", IBM, IPCOM000191856D, Technical Disclosure, Jan. 18, 2010, www.ip.com, pp. 1-3.

"Method for Controlling Memory Power", IBM, IPCOM000186042D, Technical Disclosure, Aug. 6, 2009, www.ip.com, pp. 1-5.

* cited by examiner

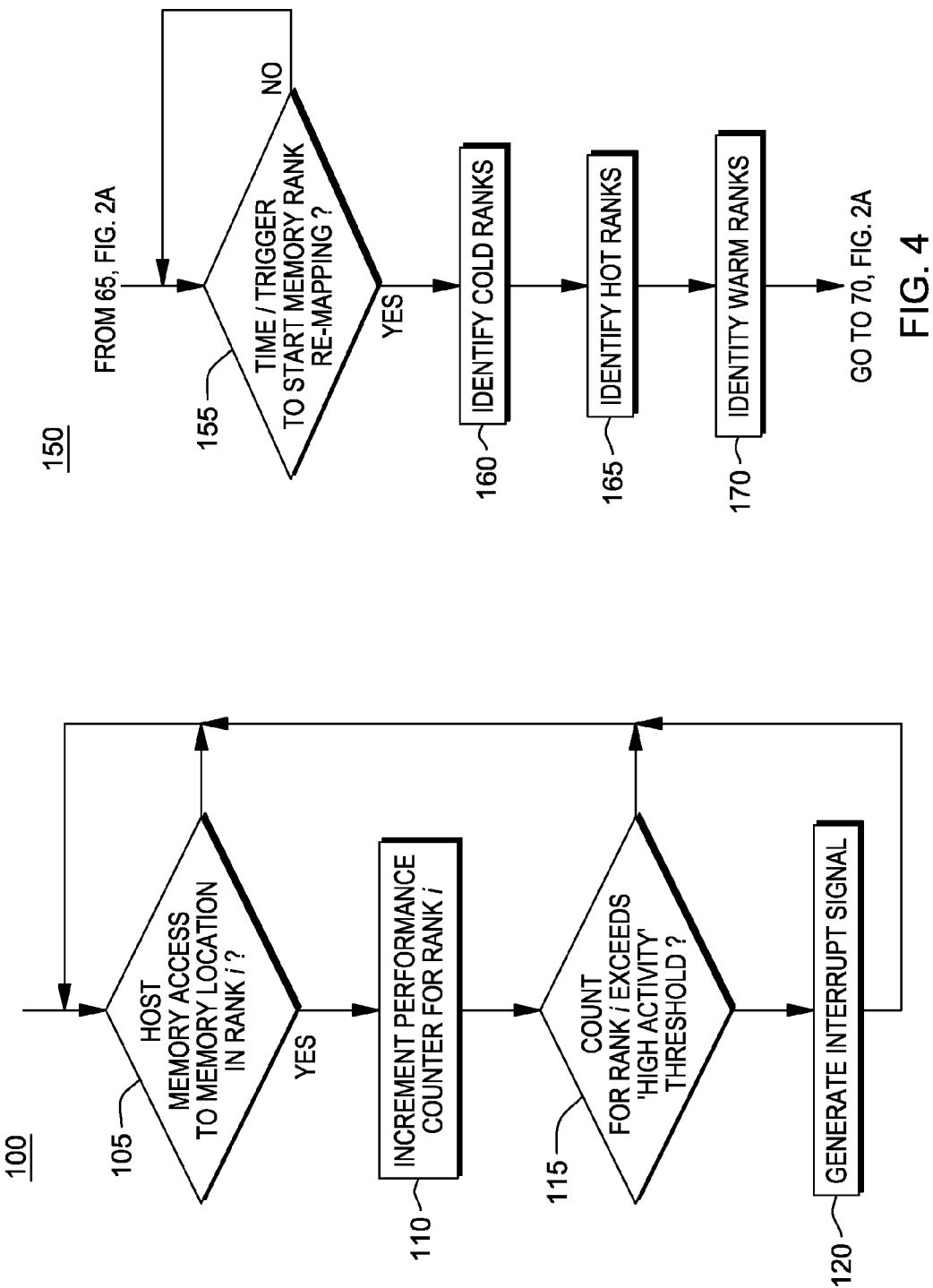

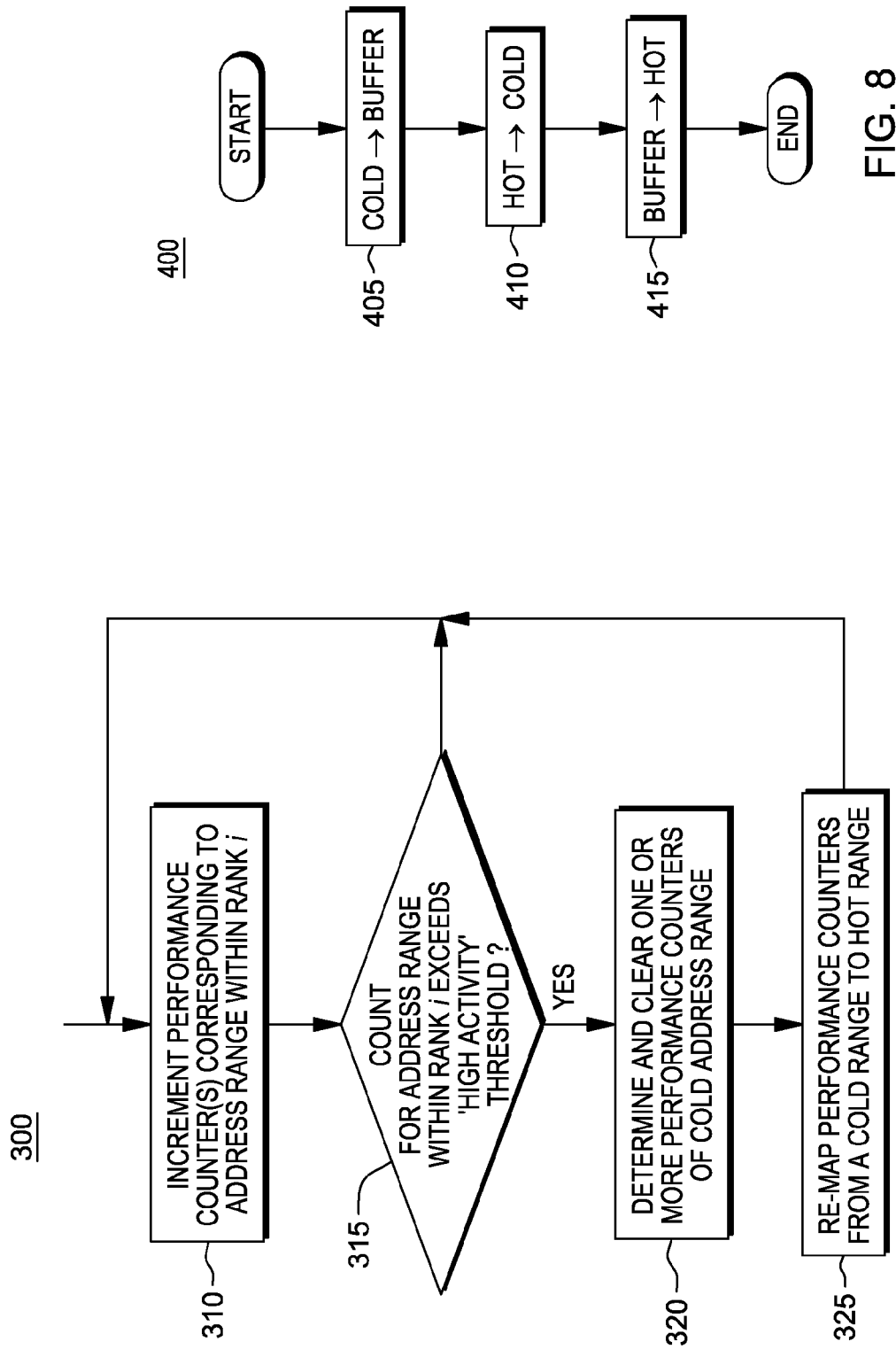

POWER REDUCTION IN SERVER MEMORY SYSTEM

BACKGROUND

The present disclosure relates generally to the systems and method implemented in computer devices and integrated circuit chips for reducing memory energy consumption, e.g., during memory access (read/write) operations; and, more particularly, to a method and apparatus for monitoring usage of memory chips and ranks from a processor, and to use this feedback to a memory controller device to change memory layout and mapping of physical memory to memory chips, and power off unused memory chips and ranks.

Power consumption of a computer system is crucial. Typical memory system power is a significant component of overall power budget. In prior art computer system designs, this power budget can be up to 50% of the overall system power.

Both power supply and heat removal are the problems and, while the patent literature is replete with descriptions of systems and methods that optimize power processor performance or reduce power consumption of the memory system, e.g., such as being placed in a lower power consumption mode, most of the prior memory system power solutions negatively impact processor performance.

Moreover, while processor devices are increasingly operating faster, processors are no longer the most significant power consumers giving way to memory. Currently memory systems further cannot be cooled adequately and, as processor power becomes reduced now is the case that memory consumes more significant portion of power, increasing the cost of such systems. Programs could be run slower effectively to save power. Thus, if a process becomes hot, techniques such as power throttling are implemented and operations switched to a lower power mode of operation (e.g., modify or reduce voltage and frequency in the core so that processor and program operates at slower speeds—an actively managed approach), are available. Other approaches include eliminating power supply to processor "islands". Each of the approaches that address excessive power consumption issues in processor devices, are not advantageous or even applicable for memory systems that include memory devices, e.g., chips, outside of the processor. For example, dropping voltage and frequency to operate slower can not be used as a way for reducing power consumption of memory chips without affecting processor performance and reliability.

It would be highly desirable to have a method and apparatus to reduce power consumption of memory system without hurting processor performance.

SUMMARY

The present disclosure provides a solution to reduce power consumption of memory chips outside of the processor itself.

Particularly, a system and method is provided for reducing power consumption of memory chips outside of a host processor device in operative communication with the memory chips via a memory controller. The memory can operate in modes, such that via the memory controller, the stored data can be localized and moved at various granularities, among ranks established in the chips, to result in fewer operating ranks. Memory chips may then be turned on and off based on host memory access usage levels at each rank in the chip.

In one embodiment, host device memory usage levels at each rank in a chip are tracked by performance counters established for association with each rank of a memory chip. Turning on and off of the memory chips is based on determined activity levels of ranks and at address locations corresponding to sub-sections within each rank receiving the host processor access requests.

Accordingly, there is provided: a method for operating a memory system having a memory controller and multiple memory chips having physical memory grouped into ranks. The method comprises: maintaining, by a memory controller device, a mapping of the ranks to physical memory addresses in the memory chips; monitoring usage of memory address locations in each the rank by a host operating system (O/S); moving, based on the memory usage, data from physical memory addresses of an identified rank into other ranks to eliminate host operating system accesses to the identified rank; and, powering off the memory chip having the identified rank.

Further to this embodiment, an execution of a program running on the host processor device is temporarily suspended prior to the moving.

Further, as the memory controller services host O/S memory access requests at address locations mapped to physical memory locations within a rank, the monitoring includes: mapping, at the memory controller, a single performance counter for association with a respective rank, and, incrementing, at a respective single performance counter of a respective rank, a respective count value for each physical memory location accessed within that respective rank.

In a further aspect, the monitoring further includes: comparing, for each respective rank, a count value of each respective counter against a first threshold indicating a first host operating system memory usage level below which that respective rank can be powered off; identifying, responsive to the comparing, one or more ranks indicating usage at or above the first type usage level; and moving data from memory locations of the identified rank to another rank indicating usage above the first memory usage level to thereby eliminate usage of the identified rank.

Advantageously a computer system is provided having a host processor device running an operating system, a memory including multiple memory chips having physical memory locations grouped into ranks, and a memory controller device interfacing the host processor with the memory system. The processor device in communication with the memory is adapted to perform a method comprising: maintaining, by the memory controller device, a mapping of the ranks to physical memory addresses in the memory chips; monitoring usage of memory address locations in each the rank by a host operating system (O/S); moving, based on the memory usage, data from physical memory addresses of an identified rank over a bus, into other ranks to eliminate host operating system accesses to the identified rank; and, powering off the memory chip having the identified rank.

Advantageously, there will be a computer program product for performing operations. The computer program product will include a storage medium readable by a processing circuit and storing instructions to be run by the processing circuit for performing a method. The method will be as described above.

BRIEF DESCRIPTION OF THE DRAWINGS

Embodiments will now be described by way of non-limiting example with respect to the following figures.

FIG. 3 illustrates a method 100 for monitoring of memory activity of a rank in one embodiment using performance counters 22 established for monitoring memory accesses at each rank;

FIG. 4 illustrates one embodiment of a method 150 for determining whether the working set of memory can be remapped to fewer ranks;

FIG. 7 shows an example of a performance counter refinement process 300 where performance counters are re-mapped to monitor finer grained regions of access activity; and, FIG. 8 conceptually shows a data migration process 400 performed in one embodiment where data of the hot page(s) of one rank is exchanged (swapped) with data, e.g., cold page(s) data of another rank.

DETAILED DESCRIPTION OF THE PREFERRED EMBODIMENTS

Figure 1:
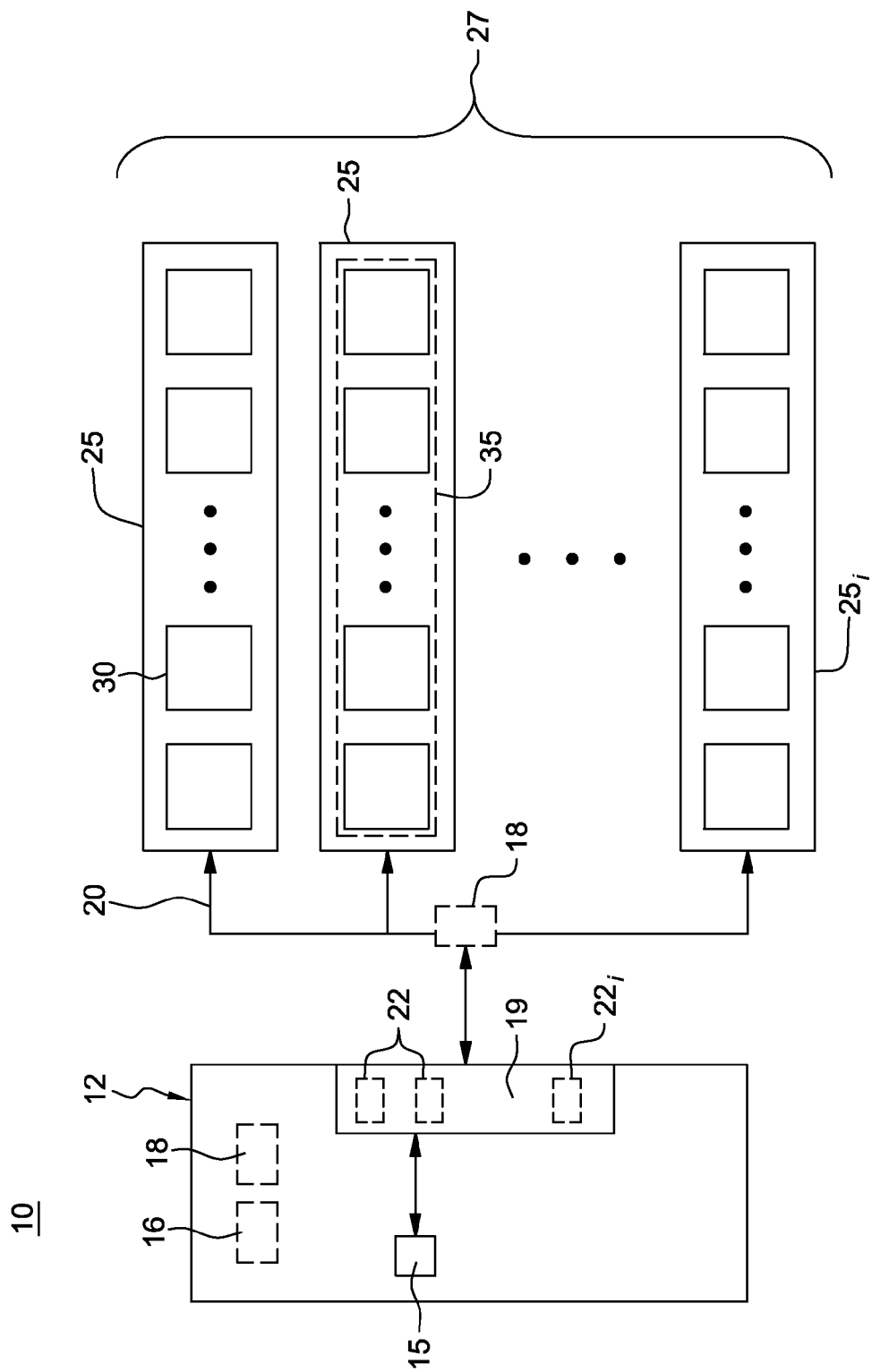
FIG. 1 shows a general system diagram of a physical memory system such as implemented in a computing device implementing the principles of the various embodiments.

FIG. 1 shows a general system diagram of a computing system 10 in which the methods and systems described herein below are implemented.

The system 10 includes a host processing device 12, e.g., a computer, server, workstation, etc., that may include one or more processor devices 15 (or processor cores) and other chips, and includes a running host operating system (O/S) 16 or a hypervisor 18 that runs on the hardware that hosts different operating systems, a physical memory 27 including one or more dynamic random-access memory (DRAM) integrated circuits (chips) 35 organized as ranks 25, and optionally, a network interface (not shown). In one embodiment, the system 10 includes a memory controller or like memory access control device (e.g. memory controller device) 19 for controlling and monitoring host or hypervisor device memory accesses. The system 10 includes, in electrical communication with the memory controller 19 such as over a data bus and address bus (shown as a bi-directional conductor device 20), at least two or more dual in-line memory modules (DIMMs) 25 that each comprise one or more ranks of DRAM chips 30. The DRAM chips are typically accessed in parallel all together, as a rank 25 such as a single rank 25$_i$ being shown. When memory is accessed, all the memory in a rank as accessed at once. While FIG. 1 shows a single rank DIMM 25, it is understood that a single DIMM may include two, four or more ranks. In one embodiment, power control is implemented at the granularity of rank, e.g., a DIMM is the smallest physical memory unit in which power may be turned on/off. It is understood that memory accesses can be both from the host O/S and from applications running on the host.

Besides the grouping of memory chips into ranks 35, in an alternative embodiment, a buffer device or chip 18 can be used between memory controller 19 and memory DIMMs 27 for server embodiments where the memory controller does not directly speak to the DRAM chips, but rather communicate through a buffer.

In one embodiment, the memory controller element 19 in the host monitors usage of ranks, and thus, memory controller element 19 (whether a separate chip or as part of the host processor) has knowledge of ranks to physical addresses. It also obtains and monitors addresses and frequency of accesses (e.g., an access being 128 bytes from a DRAM chip).

When a host processor runs, a program data is accessed according to a specified address (issued by the host or running program). For access the memory controller may first translate the issued memory addresses to an address associated with the physical location in the DIMMS which stores the memory, and ranks.

In the system, the memory controller (or hypervisor) implements a monitor so it knows at all times which parts of memory are frequently accessed e.g., "hot" memory rank, and which parts of memory are less frequently accessed e.g., in "cool" ranks. The monitors are implemented to identify which ranks are hot or cold.

For example, as shown in FIG. 1, there is provided performance monitors such as counters 22 which are established by the host or memory controller element 19 to keep track or count the number of accesses to and the frequency of accesses to addresses of memory locations of a corresponding rank. Such monitoring of the number and frequency of memory accesses provide the knowledge for determining states of rank, e.g., high activity memory ranks and low activity memory ranks. In the embodiment of FIG. 1, one performance counter 22 is assigned or mapped to receive and count memory usage access data of each memory rank 25 from the memory controller or host operating system or hypervisor. An average or frequency of accesses per unit time for each rank (access frequency) can be additionally determined from the number of memory accesses.

In a further aspect, the methodology employs migrating data in cold ranks to hotter ranks so that the power to the DIMM providing the "cooler" rank may be turned off. Alternatively, the power to the DIMM providing the "cooler" rank may be put in a reduced or low power mode. In one embodiment, the actual memory access monitoring and migrating of data among ranks is performed by the memory controller, or alternately, the memory access monitoring and migrating of data among ranks is performed by the host device operating system and/or hypervisor, or any combination thereof.

Figure 2A:
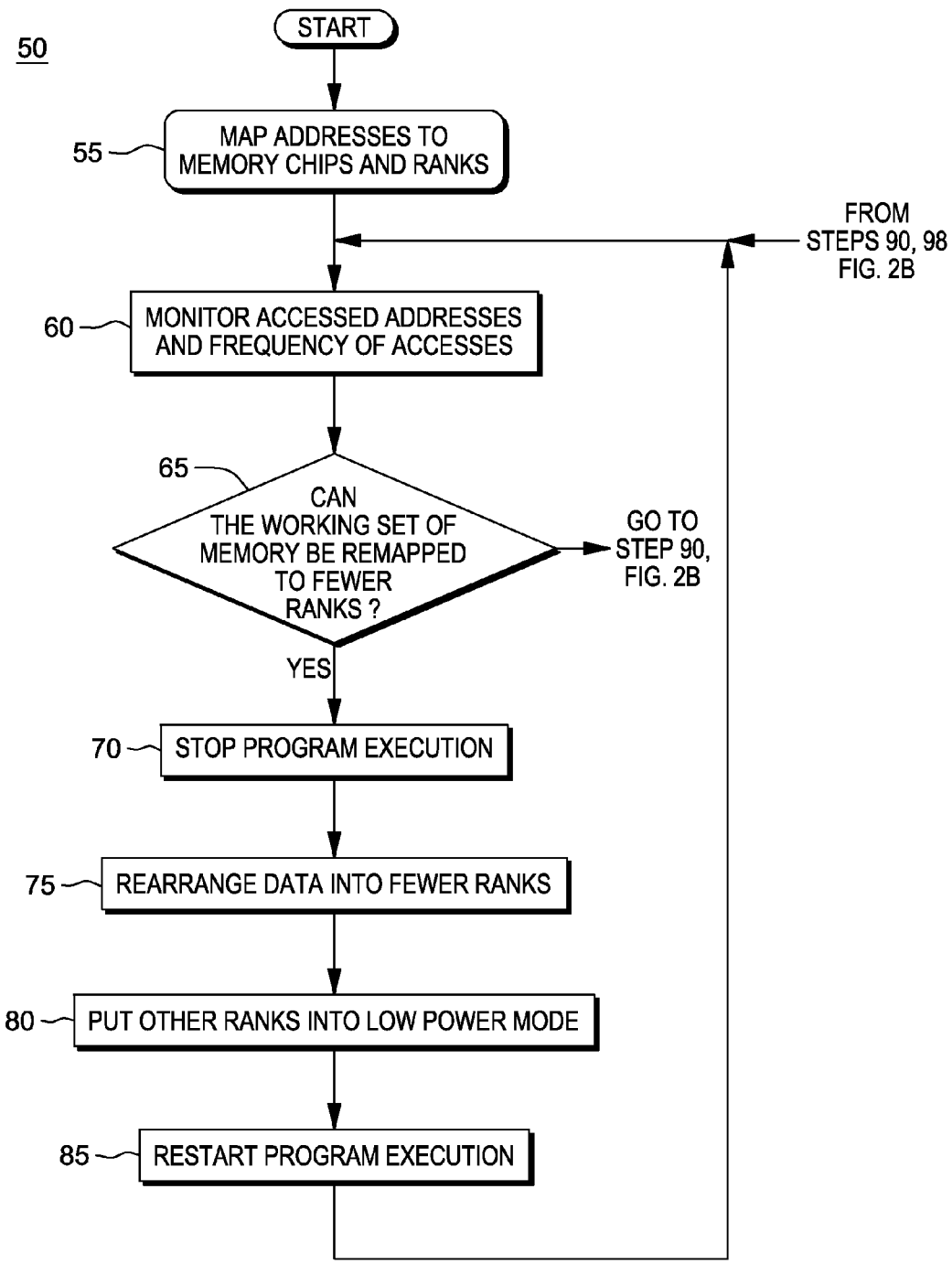
FIGS. 2A and 2B show a flowchart of a method 50 implemented by a host for performing operations to migrate data from cold or cool ranks to other "hotter" or "warmer" ranks according to an embodiment.
Figure 2B:
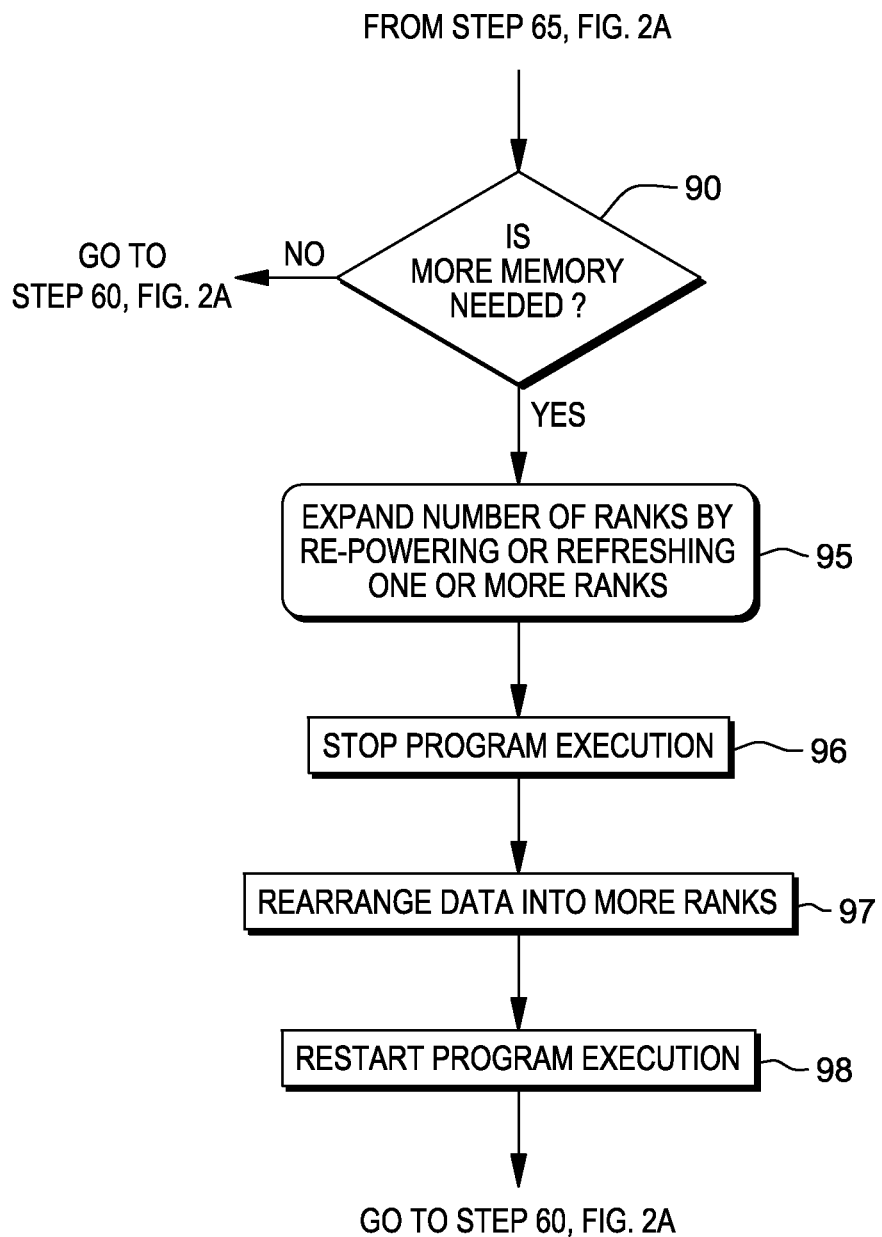

FIGS. 2A and 2B show a flowchart of a method 50 implemented by a host for performing operations to migrate data from cold or cool ranks to other "hotter" or "warmer" ranks according to an embodiment. Essentially, the monitoring and decisions for migrating are described with respect to FIGS. 2A and 2B.

In FIG. 2A, at 55, there is performed the mapping, by the memory controller element, of host system issued addresses to the DRAM chips 30 and ranks 25. At 60, the memory controller element continuously monitors access patterns of addresses and frequency of accesses, including what ranks are being accessed and their access frequency, and gathers/updates statistics about the ranks. Generally, there is performed monitoring of individual rank behavior, and monitoring of behavior within a rank. This requires address to rank mapping and provides ability to determine hot vs. cold ranks. In a further monitoring refinement, after finding the hot/cold ranks, there is performed finding of specific parts, e.g., pages, of a rank that are hot and cold and identify those as candidates for migration onto other ranks.

FIG. 3 illustrates a method 100 for monitoring of memory activity of a rank in one embodiment using the performance counters 22 established for monitoring memory accesses at each rank 25 as shown in FIG. 1. In FIG. 3, the method determines at 105 whether a host or memory controller 19 has accessed a memory location in a rank i, for example. In one embodiment, this is determined by the memory controller performing an address translation, e.g., when receiving data from the host at the memory controller for placement at address locations in the DRAM of a particular rank 25. If at 105 it is determined that the host has accessed the location in the corresponding memory of the rank, the performance counter $22_i$ is incremented at 110. In one embodiment, a trigger may be set up in the performance counter of each rank i that triggers on achieving a particular count value. In one embodiment, a count value corresponds to a "high activity" threshold of accesses, and when reached, an interrupt generated by the system for receipt at the host, hypervisor or memory controller. Alternately, or in addition, the count value corresponds to a "low activity" threshold or frequency of accesses, and when reached, an interrupt generated by the system for receipt at the host, hypervisor or memory controller. In one embodiment, the "high activity" and "low activity" threshold value is programmable. For example, for N ranks with W writes, the high activity threshold could be 2*W/N and the low activity threshold could be W/2N. Thus, as shown in FIG. 3, the method determines at 115 whether the count for the accesses to memory locations in rank i exceeds the programmed high activity threshold value for that rank. If the programmed high activity threshold value is exceeded, then a system interrupt is generated for receipt by the host operating system (O/S) at 120. Otherwise, the process continues by returning to the monitoring at 105. In a further embodiment, the method includes periodically clearing the counters (re-setting to zero, for example), or clear the counter upon reaching a predetermined count threshold.

In one embodiment, the interrupt generated at 120 may be used by the operating system or memory controller to trigger a re-mapping of the memory in the ranks, e.g., when a counter exceeds a "high activity threshold" state. Alternately, or in addition, the interrupt may be used by the operating system or memory controller to trigger a re-mapping of the memory in the ranks when a counter value drops below a "low activity threshold" indicating few processor accesses to memory locations over a predetermined period of time. Otherwise, the remapping can occur periodically, in predetermined time steps; or, as a combination.

Referring back to FIG. 2A, then, at 65, it is responsively determined by the memory controller whether the working set of memory can be remapped to fewer ranks. In one embodiment, the raw performance counter data and/or gathered statistical data is used by the monitor for determining memory rank thresholds, i.e., whether the working set of memory can or should be remapped to fewer ranks.

FIG. 4 shows in one embodiment, a method 150 for determining whether the working set of memory can be remapped to fewer ranks. Initially, as shown at 155, the method includes first determining, in the manner described herein, whether to initiate memory rank re-mapping in a first instance. For example, this determination may be in response to receiving a command from the host, receiving a generated trigger initiated by a performance counter, or occurs on a periodic time basis. Then, the determination includes at 160 identifying "cold" memory ranks which are those ranks that are mapped to counters with low activity, e.g., value is below a programmed "low activity threshold" per a unit time. Further the determination includes at 165 identifying "hot" memory ranks which are those ranks having addresses that are mapped to counters which indicate activity per a unit time above a programmed the "high activity threshold". Further at 170 there is performed identifying "warm" memory ranks which are those ranks that are mapped to counters which indicate any degrees of activity below the "high activity threshold".

Returning to FIG. 2A, if it is determined at 65 that the working set of memory can be remapped to fewer ranks, then the process proceeds to 70 where the executing program is terminated (temporarily stopped), and the memory controller functions to move (migrate) data over the bus for rearrangement into the fewer ranks at 75.

Figure 5:
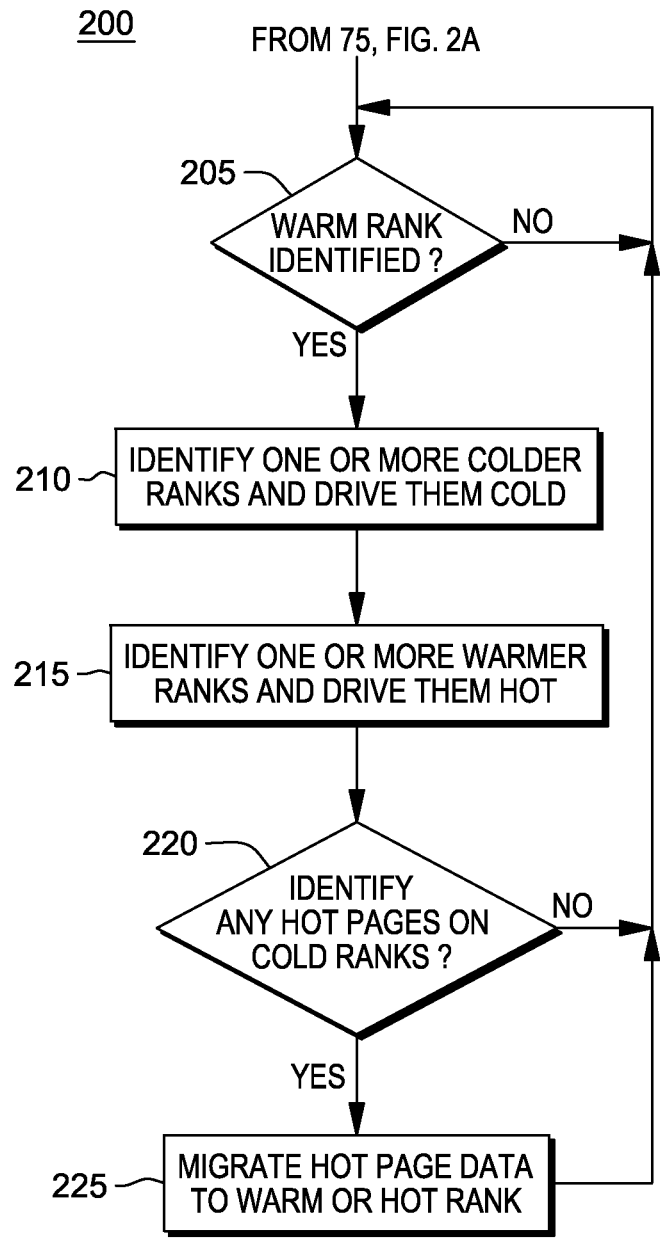
FIG. 5 shows, in one embodiment, the method 200 for migrating and rearranging data among ranks so that DIMM power consumption may be reduced or eliminated.

FIG. 5 shows, in one embodiment, the method 200 for migrating and rearranging data among ranks so that DIMM power consumption may be reduced or eliminated. First at 205 there is performed identifying the "warm" ranks and taking actions for migrating data stored therein to other ranks. For example, for each warm rank identified, there is performed by the memory controller at 210 the further identification of one or more "cooler" ranks and driving them cold by migrating, under control of memory controller 19, all of the data from DRAMs of that rank over the bus for storage into another existing warmer or hot rank of another DIMM. This effectively drives that "warm" rank of that DIMM cold. Prior host processor or hypervisor access to those memory locations of the now cold rank are subsequently re-mapped to DRAM locations of the another rank (DIMM). Further, there is performed by the memory controller at 215 the further identification of one or more "warmer" ranks and driving them hot by migrating all of the data from those warmer DRAMs for storage onto DRAMs of those DIMMs of an existing warmer rank to drive them hot.

Further, continuing in FIG. 5, at 220 there is performed by the memory controller the identifying of any hot pages that exist on the cold ranks which pages keep these ranks "warm". If there are identified cold ranks which are kept warm by presence of hot pages, then at 225, data from the hot pages in DRAM in these cold ranks are migrated, under control of memory controller 19, over the bus to existing warmer ranks or hot ranks.

In one embodiment, the identifying of any hot pages that exist on the cold ranks is performed by maintaining by a performance counter operated by the O/S or hypervisor and memory controller a list of pages, each page having a respective processor access count. For each page access by the O/S, if there is a hit in the list, then its count is incremented. If there is detected a miss, than the count for that page is replaced with the lowest count.

In a further embodiment, the identifying of any hot pages that exist on the cold ranks is performed by implementing a fully associative cache and LRU replacement policy.

As conceptually shown in FIG. 8, with the host application program temporarily stopped, a data migration process 400 is performed in one embodiment where data of the hot page(s) of one rank is exchanged (swapped) with data, e.g., cold page(s) data of another rank. The hardware implements a scratch pad or buffer memory (not shown) in which data of the cold page temporarily placed in scratch pad (buffer) at 405; the data of the hot page is placed via the memory controller in the memory locations where the cold page was at 410; and, subsequently, the cold page data is populated from the buffer storage location to the rank where the hot page data was migrated from. In one embodiment, as shown in FIG. 1, the buffer chip 18 can be used as the buffer memory, or the memory controller itself may includes a buffer or like register (not shown) that may be implemented as the scratch memory.

In such embodiment, after data migration, the prior host generated virtual addresses that were mapped to locations corresponding to the moved data in the translation table, must be modified to point (remap) to the new physical addresses of the new locations of the new rank. Particularly, the memory controller implements processes to translate virtual addresses to physical addresses that map to the ranks. As data is transferred, the translation table has to be reconfigured. Thus, when a program is stopped, the data is moved, and translation table is re-programmed prior to re-starting the running application program. The ability to change translation table mappings at run time, increases flexibility.

Returning to FIG. 2A, after migrating and rearranging the data among the ranks as described with respect to FIG. 5, then the process continues to step 80 where the ranks which had data remapped to the fewer other ranks such as cold ranks are either: 1) placed into a low power operating mode, or 2) have power removed from the DIMM to turn the rank(s) completely off. For example, those DIMMS having ranks that are now coldest having substantially no access activity are turned off. In the alternate, the DIMMs (and ranks) that are placed in a low power mode of operation are placed in possible states that trade off power vs. how long it takes to warm up in data retention: e.g., a fast exit low power down, a slow exit power down, self-time refresh, or losing all data by turning a rank completely off.

Continuing to 85, FIG. 2A, there is next performed the restarting of the program execution with the new translation table memory mappings and reduced number of ranks. Thereafter, the method returns to the monitoring step 60 which ensures the monitoring of accessed addressed and the frequency of their access.

It is understood that the process depicted in FIG. 2A is adaptable, and can work in reverse, whereby as the host activity or workload increases requiring further memory storage, the low power ranks will be re-powered up for re-balancing and possibly re-populating of memory so to not impact processor performance.

Thus, with respect to FIG. 2A, at 65, if it is determined by the memory controller that the working set of memory can not be remapped to fewer ranks, then the process proceeds to FIG. 2B where it is first determined at 90 whether more memory storage, i.e., more ranks, are needed to meet an increased host system work load, for example. If it is determined that more memory is need, then at 95, there is performed steps for increasing the amount of ranks available by powering up or refreshing one or more ranks. In addition to expanding the number of ranks, there is further performed, at 96, stopping execution of the currently running program, and, at 97, rearranging the data for placement into the added ranks, and establishing performance counters for tracking new processor accesses. Finally, at 98, the program is re-started for execution with the expanded external memory and added performance counters. The process then continues the monitoring all ranks by returning to step 60, FIG. 2A. If, at 90, it is determined that no additional memory is needed, then the process continues by directly returning to monitoring step 60, FIG. 2A.

It should be understood that the frequency of powering up or powering down ranks to re-configure the active memory make-up of the ranks is programmable, e.g., the monitoring process may be continuous. The actual implementation of making the changes however, may be varied, or performed periodically, e.g., every 5 minutes, in order to avoid fast switching (of data among ranks) and avoid any performance issues given the delays inherent in the migrating the memory among chips in the ranks.

In an illustrative example, there is provided in computing system 10 an example memory storage size of 1 GB (Gigabytes) for each rank. Host processor page accesses are at granularity of 4 Kb size per page, the rank having available 256 k pages. For example, the one rank may include 8 physical DRAM memory chips. In the illustrative example, computing system 10 may establish 32 performance counters per rank such that each counter represents activity in the 8 k contiguous pages. While a 1:1 mapping of performance counters to address ranges corresponding to a page granularity is desirable, and shown for purposes of illustration, it is understood that less or more counters may be implemented per address range, i.e., less or more than a 1:1 relation.

Figure 6B:
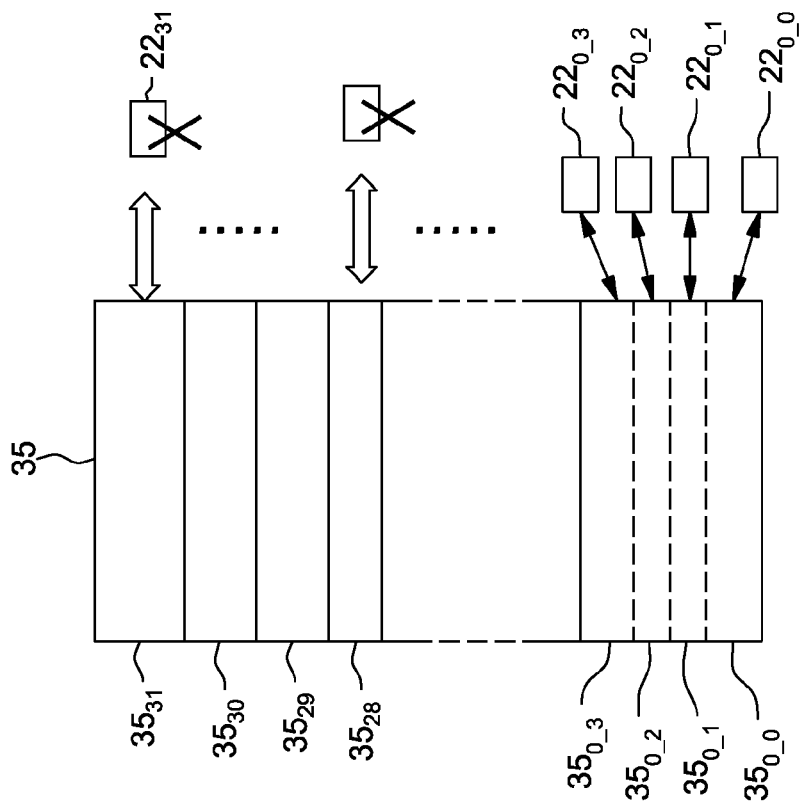
FIGS. 6A and 6B are illustrative of an address range 35 corresponding to an example rank of physical memory that is 1 Gb in size, and, in the example, logical division into the sections or address ranges for monitoring according to the principles described herein.
Figure 6A:
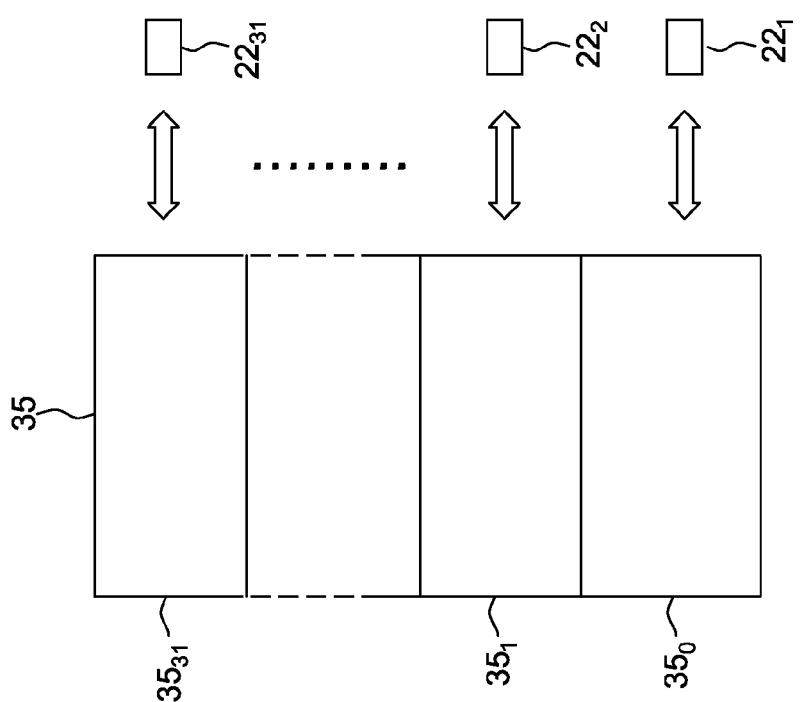

FIGS. 6A and 6B are illustrative of an address range 35 corresponding to an example rank of physical memory that is 1 GB in size. In the example, this rank is logically divided into the 32 sections or address ranges $35_0, \ldots, 35_{31}$ each corresponding to 8 Kb of contiguous pages. Corresponding performance counters $22_0, \ldots, 22_{31}$ are established, each for tracking every time an access to a memory location within the corresponding address range is performed. Using the memory controller, when an address within a range is performed, its corresponding counter is incremented and a hot region determined. Thus, for example, given a multi-bit address size, certain most significant bits (MSB) of the requested address from the bus may indicate the rank which is being accessed and the corresponding performance counter to be incremented.

Further to this embodiment, there may be added additional performance counters assigned to each page or rank for higher resolution. For example, in addition, or alternatively, the same performance counters may be re-used in phases for higher resolution.

One example of a further refinement process performed when address translation takes place is shown in FIG. 6B. In the further refinement, once an address range, e.g., range $35_1$ of FIG. 6A, is determined "hot" (according to accesses per unit time greater than a threshold), then one or more performance counters 22 that were used to monitor other address ranges, e.g., four or more ranges such as ranges $35_{28}$-$35_{31}$, are re-assigned by memory controller to correspond to a finer granularity of address range within the "hot" section. As shown in FIG. 6B, the four re-mapped performance counters $22_{0\_0}$ to $22_{0\_3}$ first have their counter cleared or re-set and then are assigned or re-mapped from sections $35_{28}$-$35_{31}$ to perform activity monitoring (counter incrementing) at the determined finer grained address ranges $35_{0\_0}$ to $35_{0\_3}$ within "hot" address range $35_0$. In one embodiment, given a multi-bit address size, additional significant bits (MSB) of the requested address from the bus may be used to indicate the rank and the sub-address range within the rank which is being accessed. Thus, the corresponding sub-address range performance counter $22_{0\_0}$ to $22_{0\_3}$ would be incremented.

For systems 10 in which the O/S is configured to handle memory at different page size granularities, with knowledge of the different page sizes, the method can be adapted to handle a mix of pages with different sizes. In one embodiment, the method would include monitoring and moving data on the granularity of larger or smaller page sizes.

FIG. 7 shows an example of the performance counter refinement process 300 where performance counters are re-mapped to monitor finer grained regions of access activity. For example, at 310, after incrementing a performance counter corresponding to address range within a rank i, the determination is made at 315 as to whether the count for the corresponding address address range within rank i exceeds a 'high activity' threshold.

In one embodiment, a metric for determining whether a rank is hot or cool may be determined, given a number of memory writes to all ranks (W), the number of writes to a particular rank i ($W_i$), and a number of memory ranks (N) as follows:

$$cool < W_i < hot$$

where the number of writes $W_i$ to the rank i is compared to values of cool and hot, where values for cool has to be less than W/N and hot has to be greater than that. The values of cool and hot can be a function of W and N, for example cool can be specified as W/2N, and hot as 1.5W/N. If a ratio or percentage of activity monitored (e.g., a number of memory "write" operations to a rank) at any one counter (rank) as compared to the activity monitored at remaining counters (ranks) is a value that is less than a value specified as "cool", it becomes a candidate for data migration. Likewise, if the percentage of activity monitored at any one counter as compared to the activity monitored at remaining counters is a value that is greater than a value specified as hot, then that would represent a warmer or hotter address range and the data in the corresponding rank becomes a candidate for data migration. It is understood that an predetermined percentage value may be used as the threshold determination of hot vs. cold (e.g., activity at any one rank occurring greater than 5% or 10% of the total activity over all ranks in a unit time).

If, at 315, FIG. 7, it is determined that the count for the corresponding address range within rank i exceeds a 'high activity' threshold, and is determined "hot", then the refinement process is performed at 320 that includes determining one or more additional performance counters that were used to monitor other address ranges within rank i that are determined cold, and clearing these counters and re-assigning, at 325, the counters to correspond to a respective finer granularity of address ranges within the "hot" section. The process will return to 31, FIG. 7 to perform activity monitoring (counter incrementing) at the determined finer grained address ranges within "hot" address range.

In a further alternate embodiment, the memory system 25 of FIG. 1 is monitored according to a "performance neutral" (e.g., quality of service (QoS)) method. The method includes adding additional monitors including the configuring of performance counters to count all accesses to the memory in a set time frame to determine bandwidth requirements for the current host processor workload. This determines and sets a limit as to the maximum number of ranks which can be placed into the low power state based on the effective bandwidth as supported by a single rank. Knowledge of how many bytes per second the program needs and determining whether there is enough ranks to accommodate the memory needs of the application is used to calculate optimum distributions of memory among ranks so that no excess bandwidth is used, only the amount that is required.

It is understood that the principles described herein may further be applied in 3-dimensional (3-D) memory systems.

Although the embodiments of the present invention have been described in detail, it should be understood that various changes and substitutions can be made therein without departing from spirit and scope of the inventions as defined by the appended claims. Variations described for the present invention can be realized in any combination desirable for each particular application. Thus particular limitations, and/or embodiment enhancements described herein, which may have particular advantages to a particular application need not be used for all applications. Also, not all limitations need be implemented in methods, systems and/or apparatus including one or more concepts of the present invention.

The present invention can be realized in hardware, software, or a combination of hardware and software. A typical combination of hardware and software could be a general purpose computer system with a computer program that, when being loaded and run, controls the computer system such that it carries out the methods described herein. The present invention can also be embedded in a computer program product, which comprises all the features enabling the implementation of the methods described herein, and which—when loaded in a computer system—is able to carry out these methods.

Computer program means or computer program in the present context include any expression, in any language, code or notation, of a set of instructions intended to cause a system having an information processing capability to perform a particular function either directly or after conversion to another language, code or notation, and/or reproduction in a different material form.

Thus the invention includes an article of manufacture which comprises a computer usable medium having computer readable program code means embodied therein for causing a function described above. The computer readable program code means in the article of manufacture comprises computer readable program code means for causing a computer to effect the steps of a method of this invention. Similarly, the present invention may be implemented as a computer program product comprising a computer usable medium having computer readable program code means embodied therein for causing a function described above. The computer readable program code means in the computer program product comprising computer readable program code means for causing a computer to affect one or more functions of this invention. Furthermore, the present invention may be implemented as a program storage device readable by machine, tangibly embodying a program of instructions executable by the machine to perform method steps for causing one or more functions of this invention.

The present invention may be implemented as a computer readable medium (e.g., a compact disc, a magnetic disk, a hard disk, an optical disk, solid state drive, digital versatile disc) embodying program computer instructions (e.g., C, C++, Java, Assembly languages, Net, Binary code) run by a processor (e.g., Intel® Core™, IBM® PowerPC®) for causing a computer to perform method steps of this invention. The present invention may include a method of deploying a computer program product including a program of instructions in a computer readable medium for one or more functions of this invention, wherein, when the program of instructions is run by a processor, the computer program product performs the one or more of functions of this invention. The present invention may include a computer program product for performing one or more of functions of this invention. The computer program product comprises a storage medium (e.g., a disk drive, optical disc, solid-state drive, etc.) readable by a processing circuit (e.g., a CPU or processor core) and storing instructions run by the processing circuit for performing the one or more of functions of this invention.

It is noted that the foregoing has outlined some of the more pertinent objects and embodiments of the present invention. This invention may be used for many applications. Thus, although the description is made for particular arrangements and methods, the intent and concept of the invention is suitable and applicable to other arrangements and applications. It will be clear to those skilled in the art that modifications to the disclosed embodiments can be effected without departing from the spirit and scope of the invention. The described embodiments ought to be construed to be merely illustrative of some of the more prominent features and applications of the invention. Other beneficial results can be realized by applying the disclosed invention in a different manner or modifying the invention in ways known to those familiar with the art.

The word "comprising", "comprise", or "comprises" as used herein should not be viewed as excluding additional elements. The singular article "a" or "an" as used herein should not be viewed as excluding a plurality of elements. Unless the word "or" is expressly limited to mean only a single item exclusive from other items in reference to a list of at least two items, then the use of "or" in such a list is to be interpreted as including (a) any single item in the list, (b) all of the items in the list, or (c) any combination of the items in the list. Ordinal terms in the claims, such as "first" and "second" are used for distinguishing elements and do not necessarily imply order of operation. The use of variable names in describing operations in a computer does not preclude the use of other variable names for achieving the same function. Items illustrated as boxes in flowcharts herein might be implemented as software or hardware as a matter of design choice by the skilled artisan. Software might include sequential or parallel code, including objects and/or modules. Modules might be organized so that functions from more than one conceptual box are spread across more than one module or so that more than one conceptual box is incorporated in a single module. Data and computer program code illustrated as residing on a medium might in fact be distributed over several media, or vice versa, as a matter of design choice.

What is claimed is:

1. A method for operating a memory system having a memory controller and multiple memory chips having physical memory grouped into ranks, the method comprising:
   maintaining, by the memory controller, a mapping of said ranks to physical memory addresses in said memory chips, said memory controller servicing memory access requests at address locations mapped to physical memory locations within a rank;
   monitoring usage of memory address locations in each said rank, said monitoring comprising:
      mapping, at said memory controller, for association with a respective single rank, two or more performance counters for monitoring memory access usage level at a respective two or more sub-sections of physical memory locations within the respective single rank;
      incrementing, at a respective performance counter of said two or more performance counters associated with a single rank, a respective count value for each physical memory location accessed within a respective sub-section;
      comparing, for each respective single rank, a count value of each respective performance counter against a first threshold indicating a first host memory usage level below which that respective rank can be powered off;
      identifying, responsive to said comparing, a rank indicating usage at or above said first host memory usage level; and
      moving data from memory locations of the identified rank to another rank indicating usage above said first host memory usage level to thereby eliminate usage of the identified rank,
   wherein execution of a program running on a host processor device is suspended prior to said moving; and
   powering off the memory chip having the said identified rank.

2. The method of claim 1, further comprising:
   moving data from memory locations of the identified rank to another rank that renders a memory access usage level at the another rank above a second threshold indicating host memory usage level at the another rank greater than said host memory usage level corresponding to said first threshold.

3. The method of claim 1, wherein said mapping at said memory controller of said two or more performance counters for association with the respective rank, comprises:
   determining, responsive to said comparing, at least two or more ranks indicating memory access usage level below said first host memory access usage level;
   clearing count values of performance counters associated with a respective rank of said at least two or more ranks below said first host memory usage level;
   switching, at said memory controller, a mapping of said two or more performance counters with said cleared count values, for association with each respective sub-section of a single rank, each said two or more performance counters for tracking memory usage at finer granularity within a single rank.

4. The method of claim 3, wherein said monitoring further includes:
   determining, responsive to said comparing, a rank indicating memory access usage level below said first host memory access usage level;
   comparing, for each respective sub-section of said single rank, a respective count value at each respective performance counter against a second threshold value indicating host memory usage level of said sub-section at the rank greater than said usage level corresponding to said first threshold; and
   moving data from memory locations of said sub-section of the rank to another rank above said first host memory usage level to thereby eliminate usage of the rank.

5. The method of claim 4, wherein said sub-section of physical memory locations accessed within the single rank corresponds to a page of contiguous physical memory locations in the single rank.

6. The method of claim 1, wherein said monitoring further comprises:
   determining whether more physical memory in the form of ranks needs to be expanded to accommodate additional memory accesses;
   adding, by said memory controller a number of ranks of physical memory; and,
   mapping, by said memory controller, a respective performance counter for association to each respective added rank of physical memory.

7. The method of claim 1, further comprising:
   providing a memory buffer device to interface with a bus device over which memory is transferred between the host processor device and said ranks, said memory buffer device adapted to temporarily hold data from physical memory addresses of the identified rank prior to a transfer of said data to said another rank.

8. The method of claim 1, wherein said monitoring includes:
   determining, by the memory controller, whether data at physical memory locations within a rank can be moved to eliminate data in the rank, at one of: a predetermined frequency or, in response to receipt at the memory controller of a trigger signal.

9. A computer system having a host processor device running an operating system, a memory including multiple memory chips having physical memory locations grouped into ranks, and a memory controller interfacing the host processor device with the memory, the host processor device in communication with said memory controller adapted to perform a method comprising:
   maintaining, by the memory controller, a mapping of said ranks to physical memory addresses in said memory chips, said memory controller servicing memory access requests at address locations mapped to physical memory locations within a rank;

monitoring usage of memory address locations in each said rank, the monitoring comprising:

mapping, at said memory controller, for association with a respective single rank, two or more performance counters for monitoring memory access usage level at a respective two or more sub-sections of physical memory locations within the respective single rank;

incrementing, at a respective performance counter of said two or more performance counters associated with a single rank, a respective count value for each physical memory location accessed within a respective sub-section; and comparing, for each respective rank, a count value of each respective counter against a first threshold indicating a first host memory usage level below which that respective rank can be powered off;

identifying, responsive to said comparing, one or more ranks indicating usage at or above said first host memory usage level; and moving data from memory locations of the identified rank over said bus to another rank indicating usage above said first host memory usage level to thereby eliminate usage of the identified rank, wherein execution of a program running on said host processor device is suspended prior to said moving; and powering off the memory chip having the said identified rank.

10. The system of claim 9, further comprising:

moving data from memory locations of the identified rank over the bus to another rank that renders a memory access usage level at the another rank above a second threshold indicating host memory usage level at the another rank greater than said host memory usage level corresponding to said first threshold.

11. The system of claim 9, wherein said mapping at said memory controller of said two or more performance counters for association with the respective rank, comprises:

determining, responsive to said comparing, at least two or more ranks indicating host memory access usage level below said first host memory access usage level;

clearing count values of performance counters associated with a respective rank of said at least two or more ranks below said first host memory usage level;

switching, at said memory controller, a mapping of said two or more performance counters with said cleared count values, for association with each respective sub-section of a single rank, each said two or more performance counters for tracking memory usage at finer granularity within a single rank.

12. The system of claim 11, wherein said monitoring further includes:

determining, responsive to said comparing, a rank indicating memory access usage level below said first host memory access usage level;

comparing, for each respective sub-section of said single rank, a respective count value at each respective performance counter against a second threshold value indicating said first host memory usage level of said sub-section at the rank greater than said usage level corresponding to said first threshold; and moving data from memory locations of said sub-section of the rank over the bus to another rank above said first host memory usage level to thereby eliminate usage of the rank.

13. The system of claim 12, wherein said sub-section of physical memory locations accessed within the single rank corresponds to a page of contiguous physical memory locations in the single rank.

14. The system of claim 9, wherein said monitoring further comprises:

determining whether more physical memory in the form of ranks needs to be expanded to accommodate additional host memory accesses;

adding, by said memory controller device a number of ranks of physical memory; and, mapping, by said memory controller device, a respective performance counter for association to each respective added rank of physical memory.

15. The system of claim 9, further comprising:

a memory buffer device interfacing with the bus device over which memory is transferred between the host and said ranks, said memory buffer device adapted to temporarily hold data from physical memory addresses of said identified rank prior to a transfer of said data to said another rank.

16. The system of claim 9, wherein said monitoring includes:

determining, by the memory controller, whether data at physical memory locations within a rank can be moved to eliminate data in the rank at one of: a predetermined frequency or, in response to receipt at the memory controller of a trigger signal.

* * * * *